Figure 1:
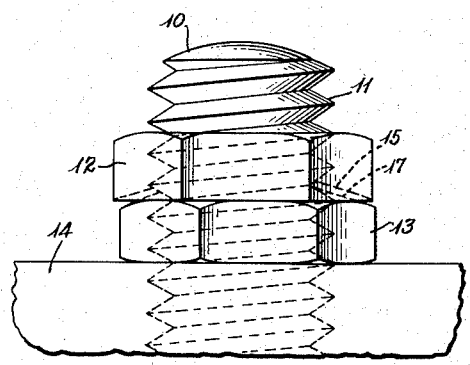

May 12, 1959  A. W. MORTON  2,886,086
SUPERPOSED LOCK NUTS HAVING OFFSET CONICAL MATING SURFACES
Filed July 1, 1955

INVENTOR
*Allen W. Morton*

BY Benjamin G. Weil

ATTORNEY

United States Patent Office 2,886,086
Patented May 12, 1959

2,886,086

SUPERPOSED LOCK NUTS HAVING OFFSET CONICAL MATING SURFACES

Allen W. Morton, Baltimore, Md., assignor, by mesne assignments, to Allen W. Morton, Baltimore, Md.

Application July 1, 1955, Serial No. 519,457

2 Claims. (Cl. 151—15)

The present invention relates to a two-piece lock-nut assembly.

Heretofore many types and forms of lock-nuts have been advanced by the prior art. In substantially all cases, however, the locking effect in assemblies of this nature is substantially achieved by means of a cam action or deforming a portion of a nut. Whereas lock-nuts which are known operate in a satisfactory fashion, nevertheless there are certain circumstances under which they will fail. For example, when used in extremely high temperatures, lock-nuts, as heretofore known, have a tendency to loosen their gripping action particularly when subject to excessive vibration.

It is accordingly an object of the present invention to provide a novel two-piece lock-nut assembly which is able to withstand unusual vibration and high temperatures and is applicable to a wide variety of uses in many types of industry.

It is a further object of the present invention to provide a two-piece lock-nut assembly which is simple and inexpensive to manufacture and which is fool-proof in operation. The design of the assembly is such that all parts may be made by automatic machining thereby enabling all parts to be produced on a mass production basis.

It is a further object of the present invention to provide a two-piece lock-nut assembly wherein the locking action is positive in the sense that the two locking nuts mutually interact to produce a sideways and angular thrust of the locking nuts against the threads of the bolt on which they are threaded. In addition to the above, the assembly of the present invention functions to produce a frictional engagement over a small area between the two lock-nuts, and an elastic clamping pressure on the bolt threads. The extent of the friction force which would be obtained will be independent of the area of contact and dependent solely on the force applied and the character of the contacting surfaces. Under these circumstances, it will be appreciated that an unusually large amount of friction force will be obtainable. As a matter of fact, it has been discovered that if the applied force is sufficient a galling action is produced in the contact area between the two nuts. The operation of the assembly, however, does not result in deformation of either the threads on the nuts or the threads on the bolt. In use, the threads on one nut are tightly wedged against the threads on the bolt at a point diametrically opposite from where the wedging action is occurring between the second nut and the bolt. It is thus evident that the assembly of the present invention is reuseable as disguished from most prior assemblies which produce thread deformation.

The dual locking principles of the present invention are based on a resolution of forces. First, vertical pressure applied to the lock-nuts is resolved into a horizontal component and a diagonal component which causes the threads on each of the nuts to squeeze the threads of the bolt at diametrically opposite areas. In addition, even more pronounced forces are generated parallel to the axis of the bolt due to clamping pressure engendered by tightening the upper lock-nut, the axis of the conical mating surface of which is inclined with reference to the axis of the corresponding conical surface of the lower nut. As mentioned previously, greater friction is obtained by the assembly of the present invention as the force over a small area is so great that the contacting surfaces are wrung together as if welded. The friction lock produced by the inclined axis structure of the present invention complements the cam-locking friction produced therein, so as to lock the lock-nut assembly both in shear and in tension.

It is a further object of this invention to provide a lock-nut having a double locking function serving to prevent vibration loosening and which holds regardless of the direction of vibration.

Figure 2:
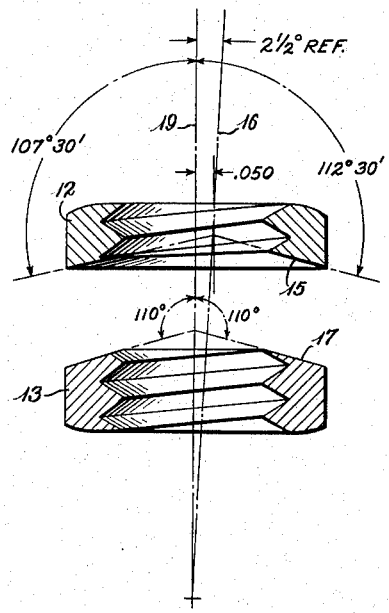

Other and further objects of the present invention will become more fully apparent from the following detailed description when taken in conjunction with the drawings in which:

Figure 1 is a view in elevation showing one form for the assembly of the present invention; and Figure 2 is a view in section through the two lock-nuts shown in Figure 1.

Referring now to the drawings in detail, there will be described in conjunction with Figures 1 and 2 the preferred form of the present invention. As will be evident from the drawings, there is shown a bolt 10 provided with threads 11 in a conventional fashion. Threaded onto the bolt 10 are a pair of lock-nuts 12 and 13. The assembly is shown with the nuts 12 and 13 bearing against a plate 14. It will be appreciated that in the portrayal of Figure 1, the head of bolt 10 lies at some point below plate 14. The lower surface of the nut 12 and the upper surface of the nut 13 are formed with conical complementary mating surfaces. The axes of the conical surfaces, however, are not in line, but rather are inclined and offset from the axis of the bolt 19. This will be particularly evident from Figure 2. Note in Figure 2 that the axis of conical surface 15 is identified by line 16 whereas the axis for conical surface 17 of nut 13 is the same as line 19. The bolt axis is also identified in Figure 2 by the line 19. It will be noted that the axis 16 of conical surface 15 is inclined to the axis 19 while the axis of surface 17 is the same as axis 19.

The natural result of the construction previously defined is an assembly wherein the adjacent faces of the two lock-nuts slope in the same general directions. Consequently, when the upper lock-nut 12 is tightened against the lower lock-nut 13, forces are generated at right angles to the axis of the bolt 10 as well as parallel to the axis of the bolt. The action of the inclined axis upper nut exerts downward axial tension, setting up forces thereby positively locking the lock-nut assembly against the bolt threads and positively locking the lock-nuts together.

The mating surfaces 15 and 17 have been shown as plane surfaces. It will be appreciated that curved surfaces could be used as well. The angles of the mating surfaces to the axes of nuts 12 and 13 are shown as being the same, but this is not required as surface 15 could be at a smaller angle to the axis than surface 17 or vice versa. In fact, by making the concave or female surface of one nut more inclined than the convex or male surface of the other, a better seal between the members is obtained. The axes of both the convex cone and the concave cone could be tilted at an angle to the threaded hole in the nut if desired. In any event, the sidewise force generated when the nut 12 is tightened against the nut 13 causes the threads of the two nuts to bear against the threads of the bolt 10 at diametrically opposite points.

As a further aspect of the present invention it will be noted that the steeper the conical surfaces, or in other words, the smaller the angle between the plane of the mating faces and the axis, the greater the force perpendicular to the axis. By virtue of the conical mating surfaces of the nuts 12 and 13 being angular to one another, not only is a sidewise force generated but in addition, a line or point contact between the mating surfaces is obtained. At the contact a very great compressive force is generated which materially assists in producing the locking action between the nuts by putting the parts of the lock-nut in tension and elastically locking the parts together as previously described.

Although the present invention has been shown and described with reference to specific embodiments, nevertheless various changes and modifications such as are obvious to one skilled in the art are within the spirit, scope and contemplation of the invention.

What is claimed is:

1. A lock-nut assembly comprising a pair of nuts having threaded openings extending therethrough, adapting them to be threaded unto a bolt, the bottom nut having its lower surface adapted to contact a work surface, the upper surface of the lower nut and the lower surface of the upper nut having substatnially complementary and substantially frusto-conical surfaces surrounding the threaded openings, the axis of the frusto-conical surface of the lower nut coinciding with the opening in the lower nut and the axis of the conical surface of the upper nut being offset from the axis of the opening of said upper nut and slightly inclined in the plane of the offset with respect to the axis of the opening in the upper nut.

2. In combination with a threaded bolt, a lock-nut assembly comprising a pair of nuts threaded on said bolt, the inner nut having its inner surface adapted to contact a work surface, the outer surface of the inner nut and the inner surface of the outer nut having substantially complementary and substantially frusto-conical surfaces, the axis of the frusto-conical surface of the inner nut coinciding with the axis of the bolt and the axis of the conical surface of the outer nut being offset from the axis of the bolt and slightly inclined in the plane of the offset with respect to the axis of the frusto-conical surface of the inner nut, whereby the radial component of the axial forces generated by tightening the nuts against one another will increase and force the respective nuts to bear against the threads of the bolt at diametrically opposite sides of the bolt, and the threads of the bolt will be stressed radially in compression and axially in tension, the inclination of the axes of the opposing mating surfaces of the nuts will decrease and the assembly will be locked together by tension, compression, and a camming action.

References Cited in the file of this patent

UNITED STATES PATENTS

| 421,358 | McDonah | Feb. 11, 1890 |
| 990,122 | Dunham | Apr. 18, 1911 |
| 1,832,060 | Strid | Nov. 17, 1931 |

FOREIGN PATENTS

| 584,424 | France | Nov. 20, 1924 |